United States Patent [19]

Ishiguro et al.

[11] 4,210,393
[45] Jul. 1, 1980

[54] DEVICE FOR AUTOMATICALLY CONTROLLING DIAPHRAGM APERTURE

[75] Inventors: Yasuo Ishiguro; Kenji Wakazono; Toshihisa Saito, all of Tokyo, Japan

[73] Assignee: Copal Company Limited, Tokyo, Japan

[21] Appl. No.: 932,476

[22] Filed: Aug. 10, 1978

[30] Foreign Application Priority Data

Aug. 15, 1977 [JP] Japan ................................ 52/97014

[51] Int. Cl.² ............................................. G03B 7/08
[52] U.S. Cl. ................................... 354/23 D; 354/43
[58] Field of Search ...................... 354/23 D, 43, 271

[56] References Cited

U.S. PATENT DOCUMENTS

| 4,034,383 | 7/1977 | Mashimo et al. | 354/43 X |
| 4,058,816 | 11/1977 | Nobusawa | 354/43 X |

Primary Examiner—Michael L. Gellner
Attorney, Agent, or Firm—J. Harold Nissen

[57] ABSTRACT

An automatic diaphragm aperture controlling device which includes an exposure information pulse generation circuit to generate a pulse in a number corresponding to an aperture value to be controlled, the obtained pulses being based on exposure informations such as a scene brightness or the like. A counter circuit is provided for counting the output of the exposure information pulse generation circuit, together with an aperture value pulse generation circuit for generating pulses in a number corresponding to an aperture value of a diaphragm stopped down in association with a diaphragm drive, and diaphragm fixing means for fixing the diaphragm aperture which fixing means is actuated when an aperture value pulse number is coincident with an exposure information pulse number. The aperture value pulse generating circuit includes a light source, a photoresponsive element, and an intermittent light transmitter adapted for movement between the light source and the photoresponsive element in coupled relationship to the activation of the diaphragm.

5 Claims, 4 Drawing Figures

DEVICE FOR AUTOMATICALLY CONTROLLING DIAPHRAGM APERTURE

BACKGROUND OF THE INVENTION

This invention relates to a device for automatically controlling a diaphragm aperture, and more specifically to such a device for a single lens reflex camera, which is capable of automatically setting an aperture value so as to obtain a proper exposure based on exposure informations such as scene brightness, shutter speed, film sensitivity, etc.

It has previously been proposed to provide various devices for automatically controlling diaphragm a aperture of the type as above described, such as:

(1) a system for controlling the aperture by mounting a diaphragm blade on a moving coil for an exposure meter instead of the meter pointer, (2) a system which relies on a servomotor and a servo-amplifier to balance a servo-system to obtain a proper aperture, (3) a system for locating the meter pointer to limit a stop-down, and (4) a system which is adapted to fix the diaphragm by using electromagnetic means when the output voltage of a potentio-meter in association with the diaphragm and the output voltage of a photometric circuit are equalized to each other upon comparison therebetween.

It has been customary to widely employ the system (3) or (4) due to the fact that still cameras are generally required to provide a short aperture control time. Disadvantages derived from the use of the system are, however, that a micrometer which is mostly actuated by a weak current lessens a mechanical reliability. Problems associated with the use of the system (4) are the need of a potentiometer with a high-tolerance, which is operated in cooperation with the aperture at a relatively high speed.

It is a primary object of the present invention to eliminate the aforementioned disadvantage of conventional device for automatically controlling diaphragm aperture and to improve such devices.

A further object of this invention is to provide a device for automatically controlling diaphragm aperture, simple in structure and inexpensive in manufacture, which is capable of ensuring its performance without necessity of parts with a high tolerance.

The present invention is characterized in that a pulse number generated by switch means opened and closed in association with a diaphragm drive, is applied to a first counter circuit, and that the output of a second counter circuit to which a pulse in number corresponding to the aperture value to be controlled has already been applied or the output of a latch circuit fixing such aperture number is compared by a digital comparator to the output of the first counter circuit, and that the diaphragm aperture is fixed by electromagnetic means or the like when the both informations coincide with each other.

More specifically, a pulse number is provided corresponding to a stop-down volume by an electromagnetic or mechanical switch or the like in cooperation with a stop-down to serve as an exposure information. This information is compared by a digital comparator with a pulse number corresponding to the aperture value to be set as fixed in a latch circuit or a counter circuit. The diaphragm aperture may be fixed by actuation of electromagnetic means with the output of a digital comparator when the both pulse numbers are coincident with each other upon comparison to obtain a proper aperture.

This arrangement has advantages in that the aperture information is provided without necessity of a potentiometer with a high tolerance. A control station is composed of only a digital circuit and is thus readily converted to an integrated circuit to render the structure simple.

The present invention will be now explained by reference to the following description of preferred embodiment of the invention taken in conjunction with the accompanying drawing.

DESCRIPTION OF THE PREFERRED EMBODIMENT

Figure 1:
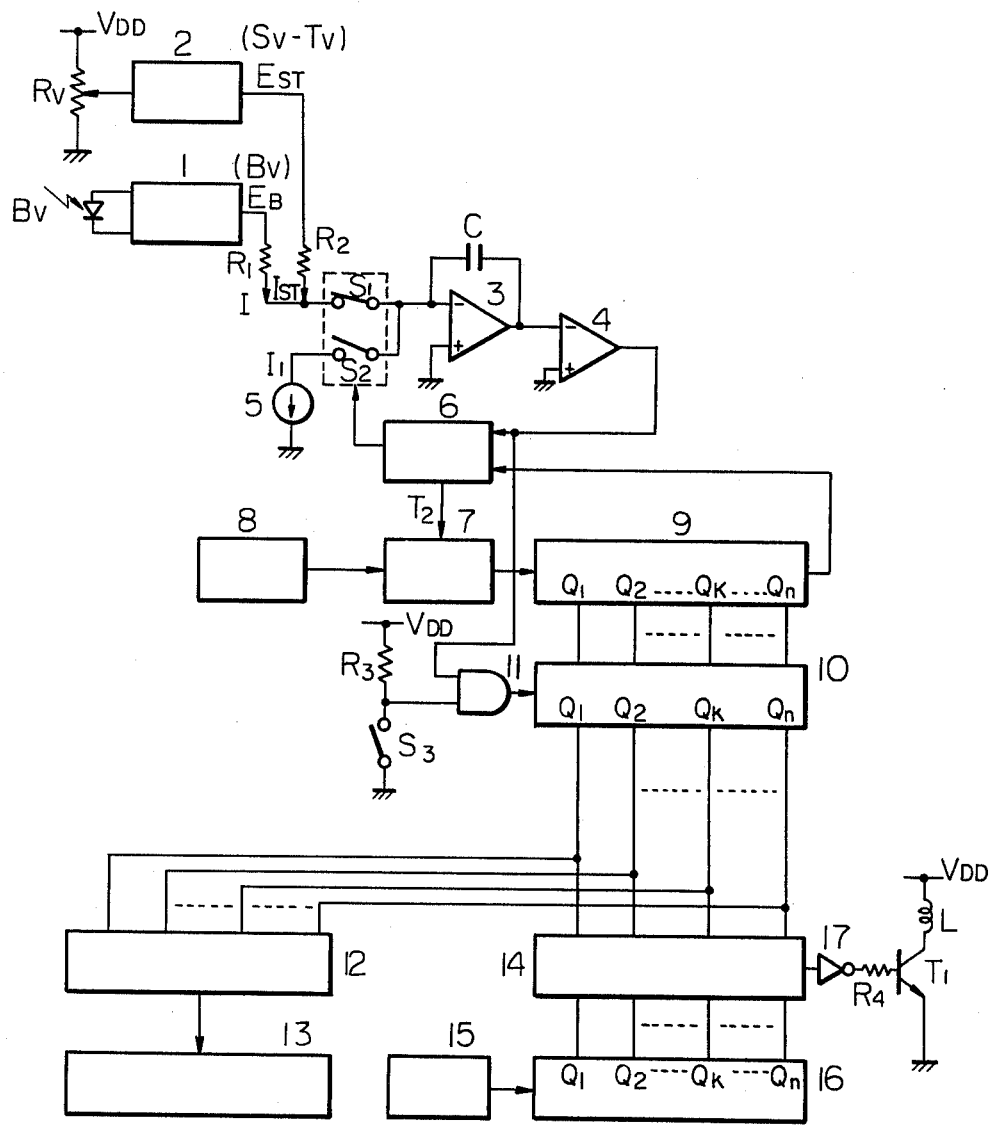
FIG. 1 is a circuit diagram showing an embodiment of device for automatically controlling diaphragm aperture according to the present invention.

In a circuit of the present invention shown in FIG. 1, upon depression of a camera shutter release, a power switch (not shown) is closed to apply a desired voltage to each of parts of the circuit as shown. A photovoltage generating circuit 1 generates a voltage $E_B$ corresponding to a scene brightness $B_V$. The output voltage of the circuit 1 flows through a resistance $R_1$ to provide a photocurrent $I_B$. An exposure information setting circuit 2 is adapted to generate an exposure information voltage $E_{ST}$ set corresponding to a given shutter speed, film sensitivity by a variable resistance $R_V$ connected to a power source voltage $V_{DD}$. The output of the circuit 2 flows through a resistance $R_2$ to involve an exposure information current $I_{ST}$. The photocurrent $I_B$ and the information current $I_{ST}$ are applied to the inverted input of an OP amplifier 3 to which a non-inverted input is grounded through an analog switch $S_1$. A condenser C is connected between the output and the inverted input of the OP amplifier 3 and to another input of a comparator 4 to which one input is grounded. The inverted input of the OP amplifier 3 is connected through an analog switch $S_2$ to a constant current discharge circuit 5 which is adapted to establish a constant current discharge by a constant current $I_1$. Thus, when the switch $S_1$ is closed with the switch $S_2$ held open, the current $(I_B + I_{ST})$ is applied to the OP amplifier 3 to charge the condenser C. In contrast, when the switch $S_1$ is opened and the switch $S_2$ is closed, the electric charge which is charged by the condenser C flows through the discharge circuit 5 to establish the constant-current discharge. The switches $S_1$ and $S_2$ are adapted to be controlled by a control circuit 6 which is controlled by the inverted signal of the comparator 4 whose output is applied thereto. The switch $S_1$ is closed and the switch $S_2$ is opened, and they are held for a period $T_1$. After lapse of the period $T_1$, the switch $S_1$ is opened and the switch $S_2$ is closed. Again, the switch $S_1$ is closed and the switch $S_2$ is opened upon application of the inverted signal from the comparator 4 thereto. This will be repeated.

Let the capacity of the condenser C be C, the charged voltage $V_{C1}$ which charges the condenser C when the switch $S_1$ is closed for the period $T_1$ would be:

$$V_{C1} = \frac{I_B + I_{ST}}{C} T_1$$

at which time, the output voltage $V_O$ of the OP amplifier 3 can be expressed by:

$$V_O = -V_{C1} = -\frac{I_B + I_{ST}}{C} T_1$$

After lapse of the period $T_1$, the switch $S_1$ is opened to close the switch $S_2$ so that the electric charge of the condenser C is discharged through the constant-current discharge circuit. In this case, let the time elapsed be t, the voltage $V_C$ of the condenser C would be changed by $$V_C = V_{C1} - \frac{I_1}{C} t = \frac{(I_B + I_{ST})T_1 - I_1 t}{C}$$

the output voltage $V_O$ of the OP amplifier 3 is also increased with the time elapsed according to the following.

Thus, the time $T_2$ which renders $V_O$ zero ($V_O=0$) may be sensed by the comparator 4 and it would be:

$$(I_B + I_{ST})T_1 = I_1 T_2$$
$$T_2 = \frac{(I_B + I_{ST}) T_1}{I_1}$$

by substituting into this $$I_B = KB_V, I_{ST} = K(S_V - T_V)$$

the following is obtained:

$$T_2 = \frac{KB_V + K(S_V - T_V)}{I_1} T_1$$
$$= K'(B_V + S_V - T_V) = K'A_V$$

In other words, the time $T_2$ is what corresponds to a proper aperture value information $A_V$ determined in relation to the scene brightness $B_V$ and the set exposure information ($S_V - T_V$).

In view thereof, the inverted signal which is obtained by inverting the comparator 4 after lapse of the time $T_2$ upon closing the switch $S_2$ allows the control circuit 6 to change over the switches $S_1$ and $S_2$ whereas a gate circuit 7 controlled by the control circuit 6 is opened for the time $T_2$ to feed the standard clock pulse generated by a clock pulse generation circuit 8 to a first counter 9 to perform a calculation corresponding to the proper aperture value information $A_V$.

In fact, the condenser C is charged with electricity for the time or the period $T_1$ to change over the switches $S_1$, $S_2$, and then the condenser C is electrically discharged for the period $T_2$. After lapse of the time $T_2$, the switches $S_1$ and $S_2$ are then changed over to thus repeat charging of the condenser C. The first counter 9 is made clear before next counting whenever counting is made for the period $T_2$ then repeating such counting.

The outputs $Q_1$, $Q_2$, - - - and $Q_n$ of the counter 9 are applied to a latch circuit 10 whenever each counting is effected and they are latched by a latch signal from an and circuit 11. This and circuit 11 is connected with a connection between a resistance $R_3$ in which one input of the circuit 11 is connected to the power voltage $V_{DD}$ and an aperture value information fixing normally open switch $S_3$ to which one terminal of the circuit 11 is grounded and which is closed in cooperation with actuation of the shutter release. The other input of the circuit 11 is connected with the output of the comparator 4 to pass an inverted signal of the comparator 4 to the latch circuit 10 during opening of the switch $S_3$ to latch the contents of the counter 9 per each time $T_2$, the latched information being given to an aperture value indicating decoder 12 to convert such information allowing an aperture value indicator 13 to indicate the aperture value at each time. The one input of the and circuit 11 reaches a L level upon actuation of the shutter release to close the switch $S_3$ as described hereinafter to prevent the inverted signal of the comparator 4 from passing thereby fixing the contents of the latch circuit 10.

The output of the latch circuit 10 is applied to a digital comparator 14 whereas the output of a second counter 16 for counting the output of an aperture value generation circuit 15 for generating pulses in number corresponding to the aperture value of the diaphragm actually stopped down as described hereinafter, is applied to the digital comparator 14. As described later with reference to FIG. 2, the output of the latch circuit 10 is compared by the digital comparator 14 and is applied to the second counter 16. The inverted signal when the two are coincident with each other is to be at the level L after passing through an inverter 17. The inverted signal further passes through the resistance $R_4$ and given to a base of a transistor $T_1$ to cut it off. As detailed later with reference to FIG. 3, and electromagnet 110 is adapted to attract a diaphragm set lever 107 so as to permit of a free movement of a diaphragm ring 101 when it is energized. The coil L of the electromagnet 110 is deenergized to allow a diaphragm setting lever 107 to fix the diaphragm ring 101 to set the diaphragm in a proper exposure condition.

Figure 2:
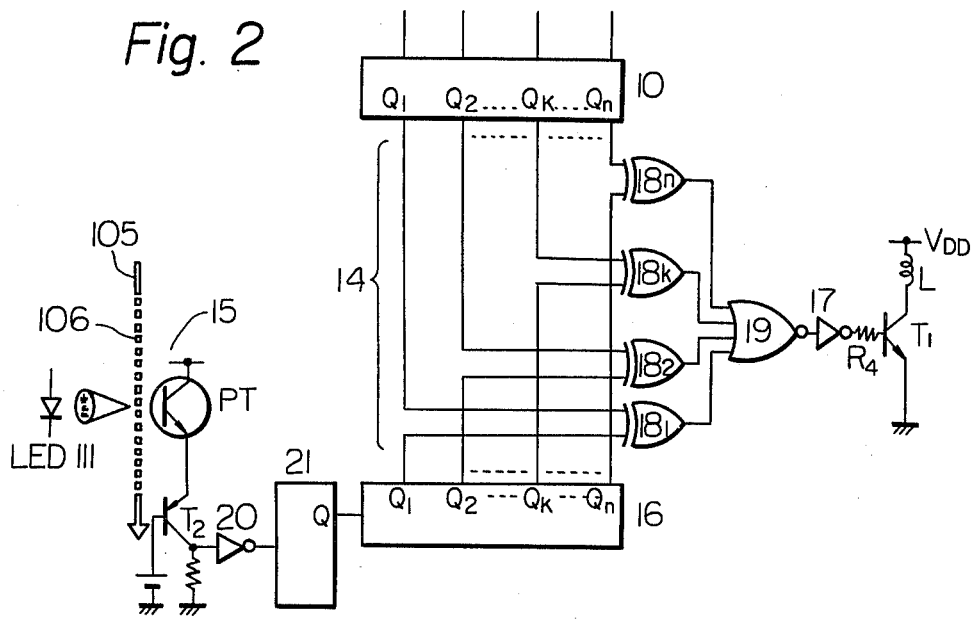
FIG. 2 is a circuit diagram showing an embodiment each of a digital comparator and an aperture value pulse generation circuit shown in FIG. 1.

FIG. 2 shows an embodiment each of the digital comparator 14 and the aperture value pulse generation circuit 15.

The digital comparator 14 is such that the inputs of exclusive "or" circuits $18_1$, $18_2$, $18_3$, - - - $18_k$ - - - $18_n$ are connected to wirings which connect the outputs $Q_1$, $Q_2$, - - - $Q_n$ of the latch circuit 10 to the outputs $Q_1$, $Q_2$, - - - $Q_n$ of the second counter 16, and that the outputs of these exclusive "or" circuits $18_1$, $18_2$, - - - $18_n$ are connected with the inputs of a not-or circuit 19 whereas the inputs of the not-or circuit 19 are connected to the inverter 17. Accordingly, there is a difference in the output between the latch circuit 10 and the second counter 16. More specifically, when the aperture value to be stopped down differs from the aperture value to be set for a proper exposure, any of the outputs of the exclusive "or" circuits $18_1$, $18_2$, - - - $18_n$ reaches an H level whereas the output of the not-or circuit 19 reaches the L level so that the signal at the H level passes through the inverter 17 and is given to the transistor $T_1$ to establish continuity across the latter to energize the coil L of the electromagnet 110 as described later thereby attracting the diaphragm set lever 107 to permit of free movement of the ring 101.

Only when the both outputs each of the latch circuit 10 and the second counter 16 are all coincident with each other, that is, the aperture value of the diaphragm to be stopped down reaches a proper aperture value, the outputs of the exclusive "or" circuits $18_1$, $18_2$, - - - $18_n$ would be at the L level, and the output of the not-or circuit 19 would be in turn at the H level so that the signal at the L level is given to the transistor $T_1$ to establish non-continuity across the same to cut off current to the coil L thus allowing the set lever 107 to stop down the diaphragm ring 101 to set a proper aperture value.

Figure 3:
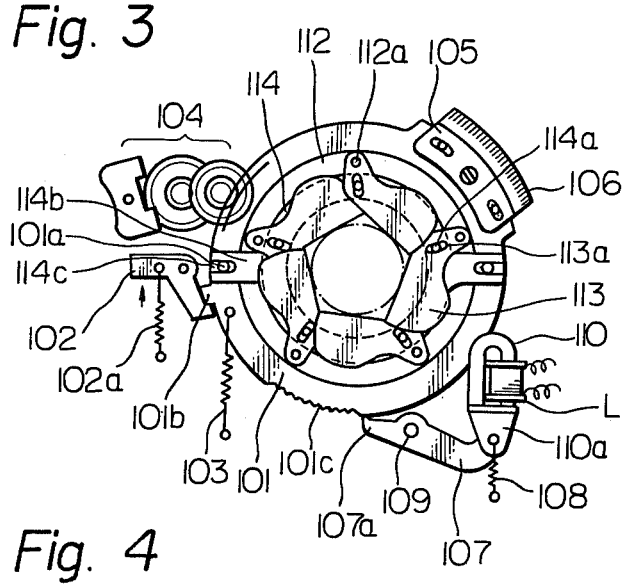
FIG. 3 is a representation of a shutter suitable for use in the present invention.

As shown in FIG. 3, the aperture value pulse generation circuit 15 includes a member 105 such as a film disposed along the periphery of the diaphragm ring 101. This member 105 is provided with a plurality of striped arranged slits 106 to pass a beam therethrough intermittently. For instance, the four slits 106 are arranged to pass through a predetermined position in response to rotation of the diaphragm ring 101 in which the diaphragm is changed in one step. Stated particularly, a light source such as a light emission diode LED is disposed on one side of the member 105 so as to converge and emit a beam after passing through a lens 111. On the opposite side, a phototransistor PT is disposed on a position corresponding to the light source to provide the output in response to the slits moved by rotation of the diaphragm ring 101 upon receipt of a beam passing through the slits 106. This output passes through the transistor $T_2$ and the inverter 20 and is then supported by a monostable multivibrator 21. By applying this output to the second counter 16, a pulse number corresponding to the aperture value of the diaphragm to be actually stopped down is counted by the second counter 16. A diaphragm for the use with the present invention includes, for instance, as shown in FIG. 3, a plurality of diaphragm blades 113 journaled by pins 112a mounted on a fixed ring 112 rotatably supporting the diaphragm 101, A slot 113a is formed in each of the diaphragm blades 113 to slidably receive therein a pin 114a of a stop-down drive ring 114 rotatably supported by the fixed ring 112. A groove 114c is formed in each of projections 114b of the drive ring 114 to receive a pin 101a fixed to the diaphragm ring 101. Thus, the drive ring 114 is rotated in association with rotation of the diaphragm ring 101 to stop down the diaphragm blades 113.

The diaphragm ring 101 is counterclockwise energized by a spring 103, and a projection 101b of the diaphragm ring 101 is engaged by a latch lever 102 energized by a spring 102a to hold the diaphragm in an open condition. The latch lever 102 is operated in association with the aperture value information fixing switch $S_3$ being closed in cooperation with actuation of the shutter release to thus release the projection 101b from latching to permit the rotation of the diaphragm ring 101. Consequently, the diaphragm blades 113 are stopped down by the drive ring 114.

The diaphragm ring 101 is provided with a peripheral serration 101c to have a time-lag governor 104 meshed therewith to slow down the drive of the diaphragm ring 101. An engaging panel or claw 107a of the diaphragm set lever 107 which is pivoted by a shaft 109 and which is clockwise energized by a spring 108, is engaged with the peripheral serration 101c under action of a spring 108 thereby preventing the ring 101 from rotating. An actuator 110a of the electromagnet 110 as well as the spring 108 is connected to the set lever 107. When the coil L of the electromagnet 110 is energized, the set lever 107 with the actuator 110a is attracted against action of the spring 108 to release the claw 107a from the serration 101c thus permitting of rotation of the diaphragm ring 101.

With the arrangement as above described, the shutter release is actuated to provide the aperture value information to be controlled for the latch circuit 10, and the switch $S_3$ is closed synchronously of a camera mirror-up starting to have the information passed through the and circuit 11 for fixing such information. Synchronously therewith, the latch lever 102 is released and delayed by the governor 104 to rotate the diaphragm ring 101 to stop down the diaphragm blades 113 so that the second counter is allowed to perform a pulse counting by the aperture value pulse generation circuit 15 corresponding to the aperture value to be stopped down. In this instance, the coil L of the electromagnet 110 is energized as previously mentioned during the time when the output of the latch circuit 10 differs from the output of the second counter 16 so that the set lever 107 is in a release position to freely permit of rotation of the ring 101.

When the discrete value of the second counter 16 is equal to the output fixed to the latch circuit 10, the output of the digital comparator 14 could be at the H level and inverted by the inverter 17 to apply the signal at the L level to the transistor $T_1$ to cut off such signal to deenergize the coil L. The diaphragm set lever 107 is then rotated under action of the spring 108 to latch the diaphragm ring 101 thereby setting the blades 113 in a proper aperture value condition.

Further actuation of the shutter release allows the shutter to run in a well known manner in a set time of second to complete a proper exposure.

In the aforementioned embodiment, no problem arises if there is no delay in the performance that the diaphragm ring 101 is fixed by demagnetization of the electromagnet with interruption of current to the coil L when the aperture value pulse number is coincident with the exposure information pulse number. To the contrary, if any delay is involved until the set lever 107 is kept way from the electromagnet 110, the two pulse numbers are not coincident with each other after lapse of coincidence interval so that the electromagnet is again excited to again attract and hold the actuator 110a of the set lever. For this reason, the diaphragm cannot be fixed to a proper diaphragm aperture position but is stopped down to the maximum position.

Figure 4:
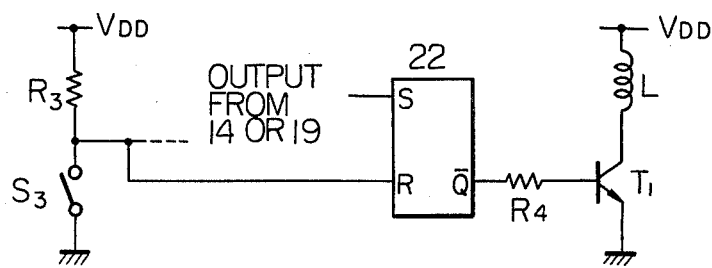
FIG. 4 is a circuit diagram illustrating another embodiment in which what is shown in FIGS. 1 and 2 is partially modified.

In FIG. 4, a flip-flop circuit 22 is employed instead of the inverter 17 to fix the inverted signal of the coincidence interval to eliminate the aforementioned defects. This circuit 22 is such that the set input S is controlled by the output of the digital comparator 14 or the output of the not-or circuit 19, and that the transistor $T_1$ is controlled by the inverted output $\overline{Q}$ through the resistance $R_4$, and that the reset input R is controlled by the signal level in a connection between the resistance $R_3$ and the switch $S_3$.

More specifically, the flip-flop circuit 22 is reset by applying the signal at the H level to the reset input R in the power source closing, and the inverted output $\overline{Q}$ is positioned at the H level. Then, the switch $S_3$ is closed at the time when the exposure information is stored, to thus invert the reset input R to the L level thereby bring it in a settable condition. At this time, since the output of the digital comparator or of the not-or circuit 19 is at the L level, the output $\overline{Q}$ is held at the H level.

Thereafter, the output of the set input S is inverted to the H level so that the flip-flop circuit 22 is set to fix the output $\bar{Q}$ to the L level.

This L level is maintained as it is until the switch $S_3$ is opened after exposure operation and then is reset.

As set forth hereinbefore, according to the present invention, the system is made simple in structure and inexpensive in manufacture to provide an excellent effect of ensuring a proper exposure control.

Having thus described the preferred embodiment of the invention it should be understood that numerous structural modifications and adaptions may be resorted to without departing from the spirit of the invention.

What is claimed is:

1. A device for automatically controlling a diaphragm aperture, comprising:
   an exposure information pulse generation circuit for generating a pulse in a number corresponding to an aperture value to be controlled obtained based on exposure informations such as a scene brightness or the like,
   a first counter circuit for counting the output of said exposure information pulse generation circuit,
   an aperture value pulse generation circuit for generating pulses in a number corresponding to an aperture value of a diaphragm stopped down in association with a diaphragm drive,
   diaphragm fixing means for fixing said diaphragm aperture, said diaphragm fixing means being actuated when an aperture value pulse number is coincident with an exposure information pulse number;
   said aperture value pulse generating circuit including:
   a light source,
   a photoresponsive element, and
   intermittent light transmitting means adapted for movement between said light source and said photoresponsive element in coupled relationship to the activation of said diaphragm.

2. The device as claimed in claim 1, wherein
   said intermittent light transmitting means is a film disposed along the periphery of said diaphragm having a plurality of slits to pass said beam therethrough intermittently.

3. The device as claimed in claim 1 or 2, wherein
   said aperture value pulse generating circuit includes a second counter circuit, and said exposure information pulse generation circuit includes a latch circuit for receiving the countings from said first counter circuit, and said diaphragm fixing means being responsive to the coincidence of the outputs of said latch circuit and said second counter circuit to thereby set a proper aperture value.

4. The device as claimed in claim 3, including a normally open switch in association with said latch circuit and a shutter release whereby to provide the aperture value information to be controlled for said latch circuit upon activation of the shutter release for fixing the aperture value information.

5. The device as claimed in claim 1 or 2, including
   an electromagnet operatively associated with said diaphragm fixing means to permit the free movement of said diaphragm when the coil of said electromagnet is energized.

* * * * *